Figure 3:
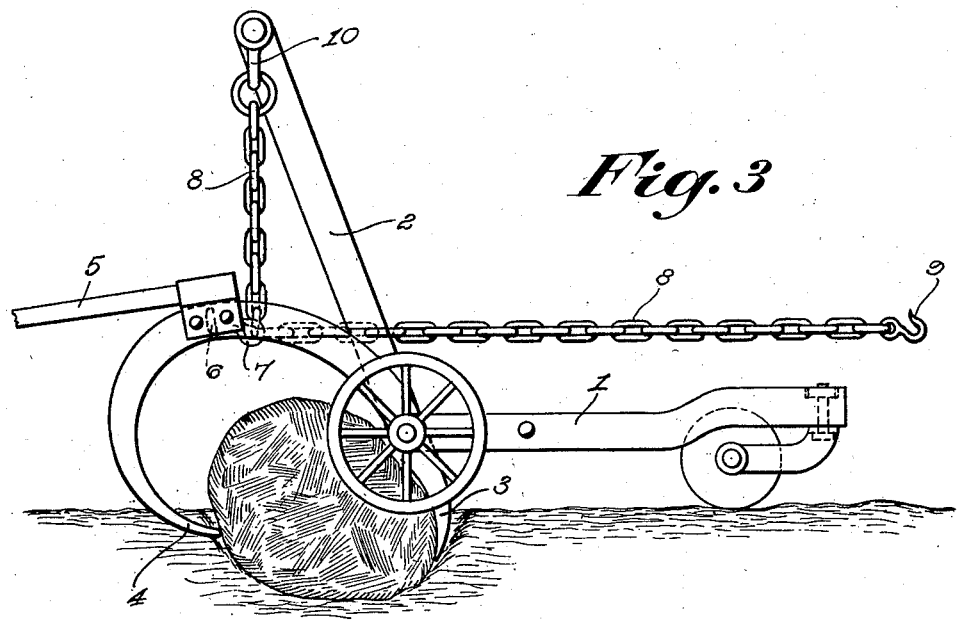

J. GUSTIN.
STONE PULLER.
APPLICATION FILED MAY 31, 1913.
1,079,939.
Patented Dec. 2, 1913.
2 SHEETS—SHEET 1.
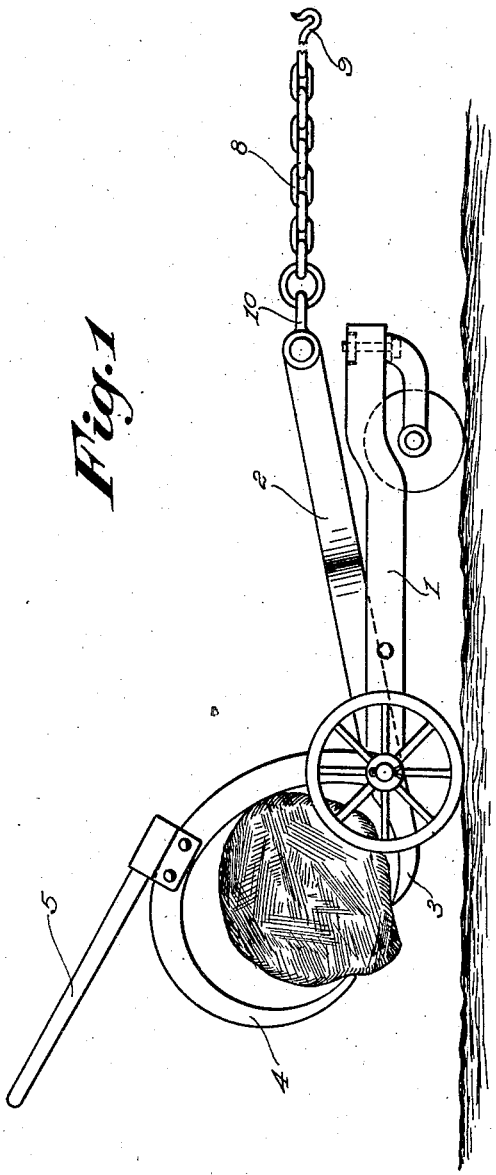
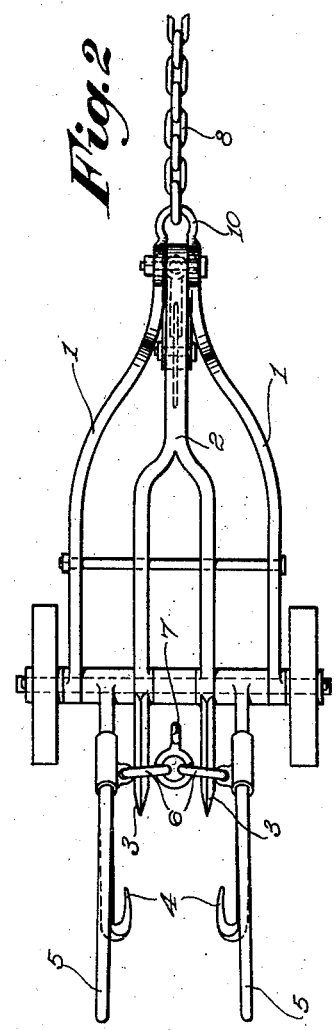
Witnesses:
JOHN GUSTIN
Inventor
By
Attorneys

J. GUSTIN.
STONE PULLER.
APPLICATION FILED MAY 31, 1913.

1,079,939.

Patented Dec. 2, 1913.
2 SHEETS—SHEET 2.

Witnesses:

JOHN GUSTIN
Inventor

By

Attorneys

UNITED STATES PATENT OFFICE.

JOHN GUSTIN, OF MERVIN, SASKATCHEWAN, CANADA.

STONE-PULLER.

1,079,939.   Specification of Letters Patent.   Patented Dec. 2, 1913.

Application filed May 31, 1913. Serial No. 770,808.

*To all whom it may concern:*

Be it known that I, JOHN GUSTIN, a subject of the King of Great Britain, residing at Mervin, in the Province of Saskatchewan, Canada, have invented certain new and useful Improvements in Stone-Pullers; and I do hereby declare that the following is a full, clear, and exact description of the invention, such as will enable others skilled in the art to which it appertains to make and use the same.

The invention to be hereinafter described relates to stone pulling machines.

In order to more clearly disclose the construction, operation, and use of the invention, reference should be had to the accompanying drawings forming part of the present application.

Throughout the several figures of the drawings like reference characters designate the same parts.

Figure 4:
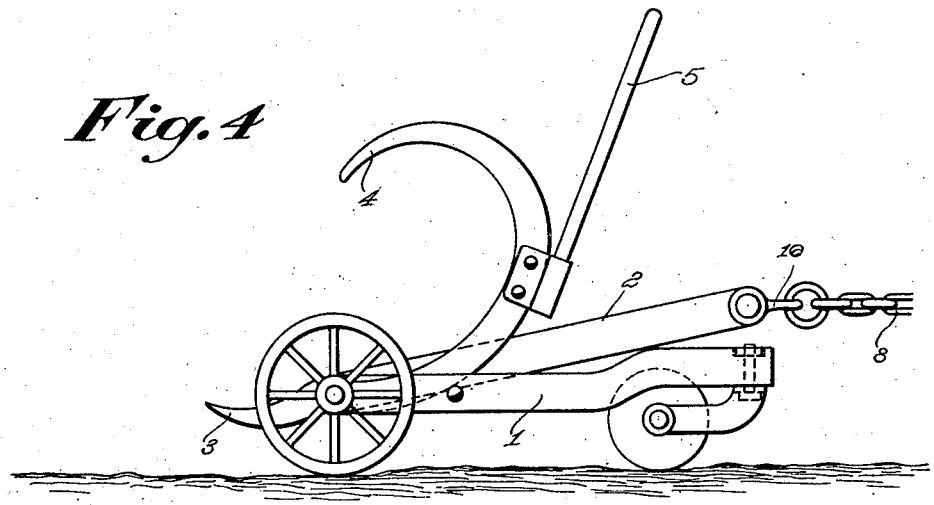

In the drawings: Figure 1 is a side elevation of the invention, in use; Fig. 2 is a top plan view of Fig. 1; Fig. 3 is a side elevation of the machine, making ready to raise a stone; and Fig. 4 is a side elevation of the machine in carrying position.

The main objects of the invention are to provide a simple, efficient, durable, economical, and compact machine capable of great lifting power.

Referring to the drawings in detail, 1 indicates a wheeled frame and 2 a beam journaled on the rear wheel supporting axle thereof. Preferably, this beam is forked and each prong of the fork, below the pivotal point, is formed as a curved and pointed hook 3. These hooks are of considerably greater length than the spokes of the rear supporting wheels. Journaled on the same axle and between each of the hooks 3 and the axle end is a gripping claw 4 provided with a suitable lifting handle 5, the two handles and the claws being connected together by a short chain or several links 6 with a draft hook 7 arranged about half way between the claws. The draft chain 8 with draft hook 9 is connected to a suitable clevis 10 in the forward end of the beam 2.

When it is desired to raise a stone, the machine will be backed up against the stone and the beam 2 raised to the position of Fig. 3. This, of course, raises the rear wheels from the ground and, at the same time, places the hook 3 against the lower front face of the stone. Then the claws 4 will be swung down behind the stone, as shown in Fig. 3. While in this position, the hook 7 will be engaged in one of the links of the chain 8. As the team draws on chain 8, the operator exerts a downward pressure on the handles 5. The result is that the hooks 3 and claws 4 will be forced toward each other, the hooks 3 entering beneath the stone in a downward and rearward direction and the claws entering in the opposite direction. During this operation, the beam 2 acts as a powerful lifting lever which tends to force the stone upward and into the grip of the claws 4. Thus, between the hooks and claws, the stone is securely gripped and lifted out, as shown in Fig. 1. To cart the stone, it is only necessary to continue draft of chain 8. When it is desired to unload the stone it is only necessary to swing the handles 5 and claws 4 clear over on to the beam 2, as shown in Fig. 4, thus, freeing the stone from the holding action of the claws and permitting it to drop—see Fig. 4.

The beam 2 and hooks 3 constitute a raising means for forcing the stone out of the earth, and the claws 4 constitute a lifting means, as will be clearly understood.

It is thought that the operation and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described my invention, what I claim as new and desire to secure by Letters Patent is:

In combination, a wheel mounted axle, a frame mounted therein, a forked beam pivotally mounted on the axle and having its two rear members curved and pointed for lifting purposes, gripping means mounted on the axle and adapted to coöperate with the lifting means, means for exerting downward pressure on the gripping means by hand, traction means secured to the forward end of the forked beam, and means for detachably connecting the traction means with the gripping means for the purpose of lifting a stone into transportable position.

In witness whereof I have hereunto set my hand in the presence of two witnesses.

JOHN GUSTIN.

Witnesses:
 J. G. OLSON,
 OLE G. OLSON.

Copies of this patent may be obtained for five cents each, by addressing the "Commissioner of Patents, Washington, D. C."